US010172507B2

(12) United States Patent
Ott et al.

(10) Patent No.: US 10,172,507 B2
(45) Date of Patent: Jan. 8, 2019

(54) HOUSEHOLD APPLIANCE WITH AT LEAST ONE LUMINOUS SURFACE IN THE TREATMENT AREA

(71) Applicant: BSH Bosch und Siemens Hausgeräte GmbH, Munich (DE)

(72) Inventors: Thomas Ott, Neubiberg (DE); Karlheinz Rehm, Dischingen (DE); Michael Georg Rosenbauer, Reimlingen (DE); Robert Sachon, München (DE); Andreas Schüssler, München (DE)

(73) Assignee: BSH Hausgeräte GmbH, Munich (DE)

( * ) Notice: Subject to any disclaimer, the term of this patent is extended or adjusted under 35 U.S.C. 154(b) by 254 days.

(21) Appl. No.: 14/349,342

(22) PCT Filed: Oct. 11, 2012

(86) PCT No.: PCT/EP2012/070166
§ 371 (c)(1),
(2) Date: Apr. 3, 2014

(87) PCT Pub. No.: WO2013/053829
PCT Pub. Date: Apr. 18, 2013

(65) Prior Publication Data
US 2014/0240959 A1 Aug. 28, 2014

(30) Foreign Application Priority Data
Oct. 13, 2011 (DE) .......................... 10 2011 084 458

(51) Int. Cl.
*F21V 33/00* (2006.01)
*A47L 15/42* (2006.01)
(Continued)

(52) U.S. Cl.
CPC ...... *A47L 15/4246* (2013.01); *F21V 33/0024* (2013.01); *G02B 6/0041* (2013.01);
(Continued)

(58) Field of Classification Search
CPC .................... F21V 33/0044; F21V 33/0028
(Continued)

(56) References Cited
U.S. PATENT DOCUMENTS 3,571,939 A * 3/1971 Paul .......................... A61L 2/10
219/400
3,915,180 A * 10/1975 Jacobs ................ A47L 15/4242
134/108
(Continued)

FOREIGN PATENT DOCUMENTS

CN 101301482 A 11/2008
DE 1051234 B 2/1959
(Continued)

OTHER PUBLICATIONS

English (machine translation) for JPH11346976.*
(Continued)

*Primary Examiner* — Tsion Tumebo
(74) *Attorney, Agent, or Firm* — Michael E. Tschupp; Andre Pallapies; Brandon G. Braun

(57) ABSTRACT

A household appliance includes a plurality of walls which delimit a treatment compartment. At least one of the walls, e.g. a rear wall of the treatment compartment, is configured predominantly or entirely with a luminous surface element. The luminous surface element can be sized to occupy at least 50% of a surface of the at least one wall and formed by a plate-shaped or panel-type element.

30 Claims, 5 Drawing Sheets

(51) Int. Cl.
*F21V 8/00* (2006.01)
*D06F 58/20* (2006.01)

(52) U.S. Cl.
CPC ........ *G02B 6/0095* (2013.01); *A47L 15/4257* (2013.01); *D06F 58/20* (2013.01)

(58) Field of Classification Search
USPC .......................................................... 362/96
See application file for complete search history.

(56) References Cited

U.S. PATENT DOCUMENTS

| | | | |
|---|---|---|---|
| 5,836,669 A | 11/1998 | Hed | |
| 5,979,472 A * | 11/1999 | Lowery | A47L 15/30 134/102.3 |
| 6,059,420 A * | 5/2000 | Rogers | A47F 3/0434 362/223 |
| 6,877,329 B2 * | 4/2005 | Bassi | F25D 27/00 62/229 |
| 6,908,204 B2 | 6/2005 | Kraft | |
| 7,156,113 B2 * | 1/2007 | Jerg | A47L 15/4246 134/105 |
| 7,215,390 B2 | 5/2007 | Moersch | |
| 7,588,340 B2 | 9/2009 | Bauer et al. | |
| 8,142,037 B2 | 3/2012 | Hering et al. | |
| 8,567,976 B2 | 10/2013 | Hamlin et al. | |
| 2004/0264168 A1 * | 12/2004 | Gotz | F24C 15/008 362/92 |
| 2005/0073628 A1 | 4/2005 | Morsch | |
| 2005/0083449 A1 * | 4/2005 | Morsch | A47L 15/4293 349/58 |
| 2006/0049188 A1 * | 3/2006 | Gramlich | F24C 15/04 219/723 |
| 2006/0201181 A1 | 9/2006 | Bauer et al. | |
| 2008/0245788 A1 * | 10/2008 | Choong | F24C 15/008 219/758 |
| 2009/0126765 A1 * | 5/2009 | Buehlmeyer | A47L 15/4246 134/115 R |
| 2009/0129114 A1 | 5/2009 | Buesing et al. | |
| 2009/0272136 A1 | 11/2009 | Knoell et al. | |
| 2009/0301530 A1 * | 12/2009 | Shin | A47L 15/4242 134/58 D |
| 2010/0033949 A1 * | 2/2010 | Hering | A47L 15/4251 362/91 |
| 2010/0207543 A1 | 8/2010 | Harwood | |
| 2010/0218793 A1 | 9/2010 | Olesen et al. | |
| 2011/0134627 A1 | 6/2011 | Hamlin et al. | |
| 2012/0055513 A1 * | 3/2012 | Eglmeier | A47L 15/42 134/22.1 |
| 2014/0240959 A1 | 8/2014 | Ott et al. | |
| 2016/0045095 A1 | 2/2016 | Gleixner et al. | |
| 2016/0051123 A1 | 2/2016 | Gleixner et al. | |

FOREIGN PATENT DOCUMENTS

| | | |
|---|---|---|
| DE | 102007021298 A1 | 11/2008 |
| EP | 1507114 A1 | 2/2005 |
| EP | 1624101 A1 | 2/2006 |
| JP | H11346976 A | 12/1999 |

OTHER PUBLICATIONS

Report of Examination CN 201280049965.9 dated Aug. 27, 2015.
International Search Report PCT/EP2012/070166 dated Jan. 22, 2013.
Report of Examination DE 10 2011 084 458.9 dated Dec. 13, 2012.

* cited by examiner

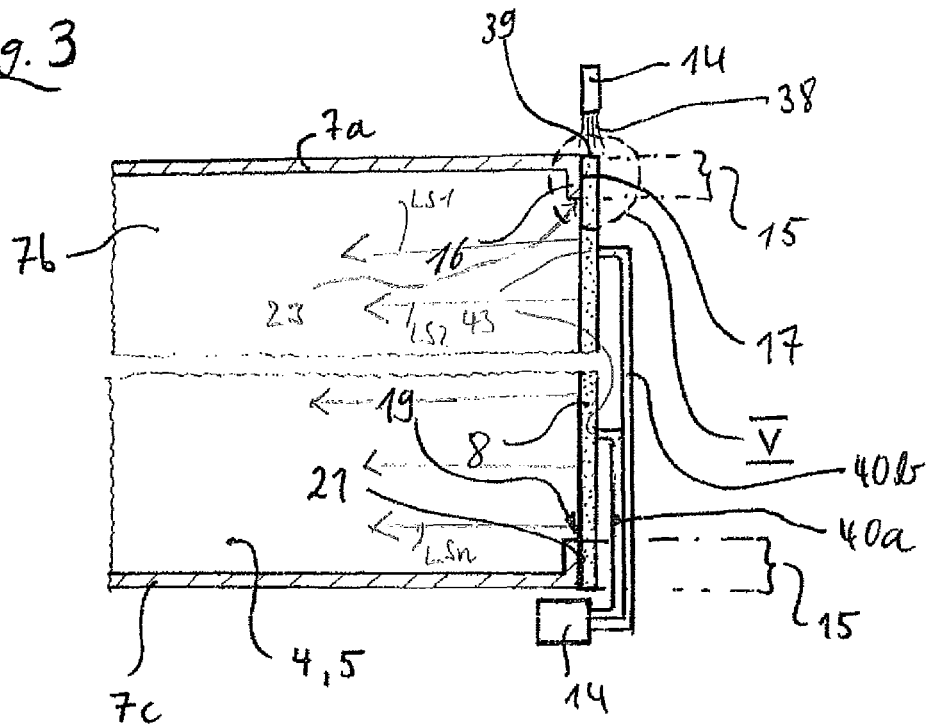
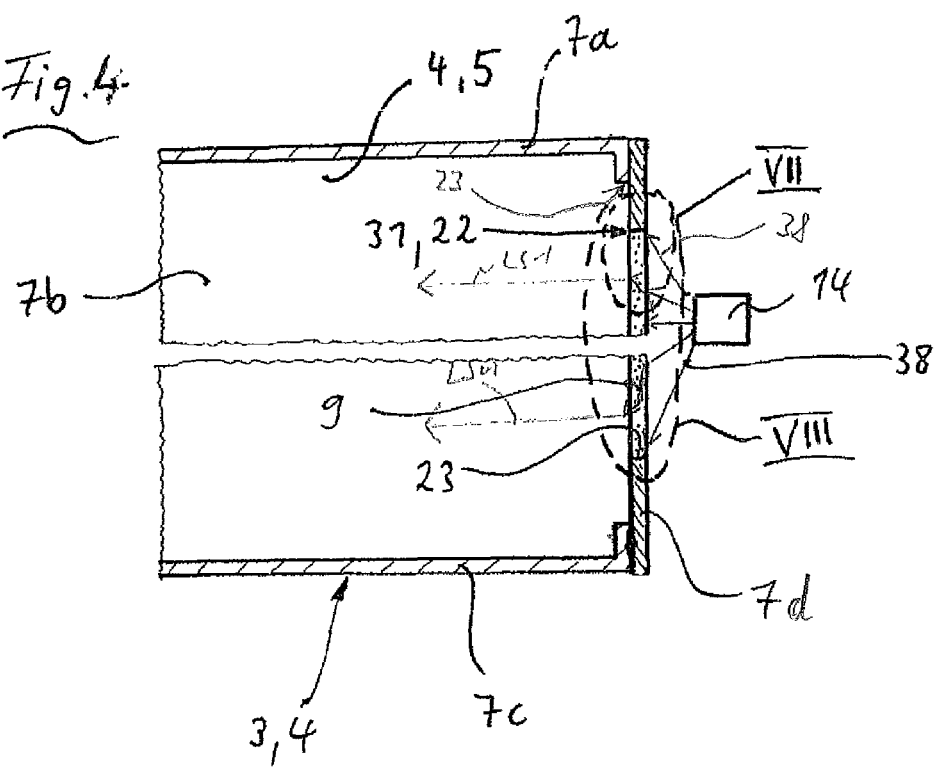

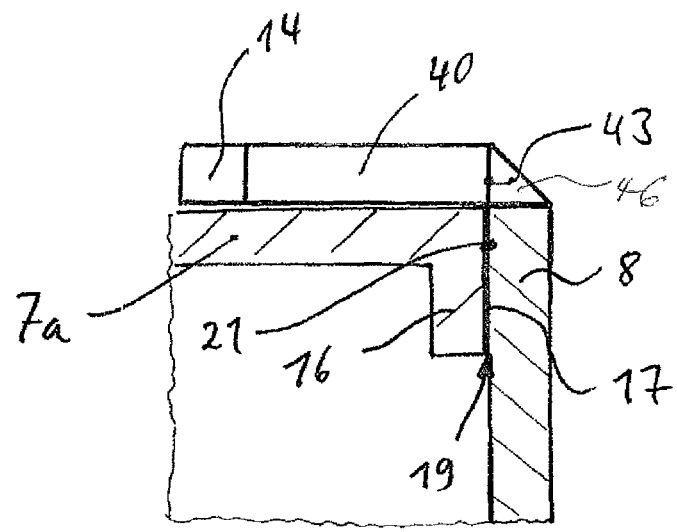
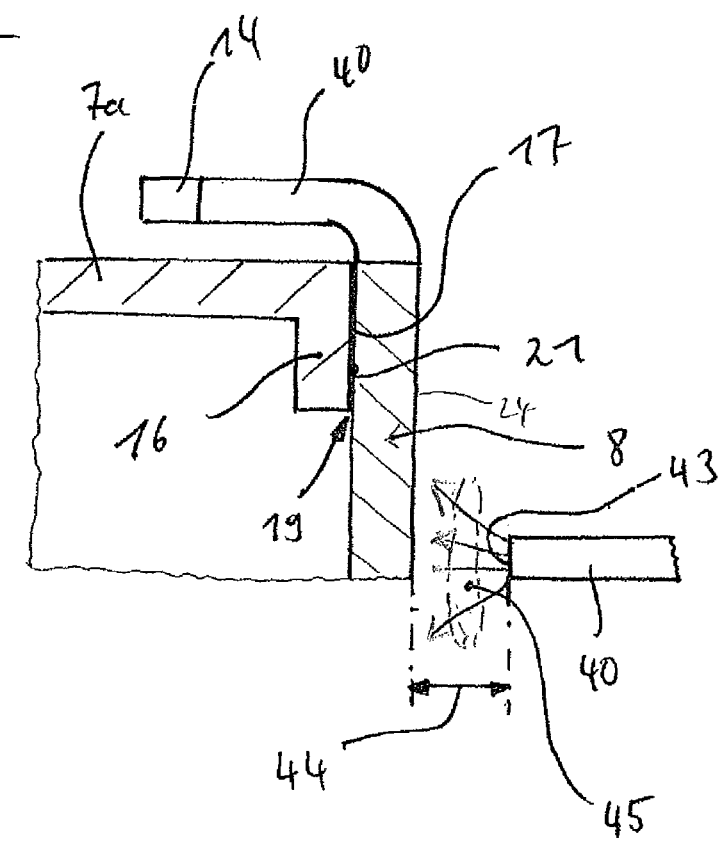

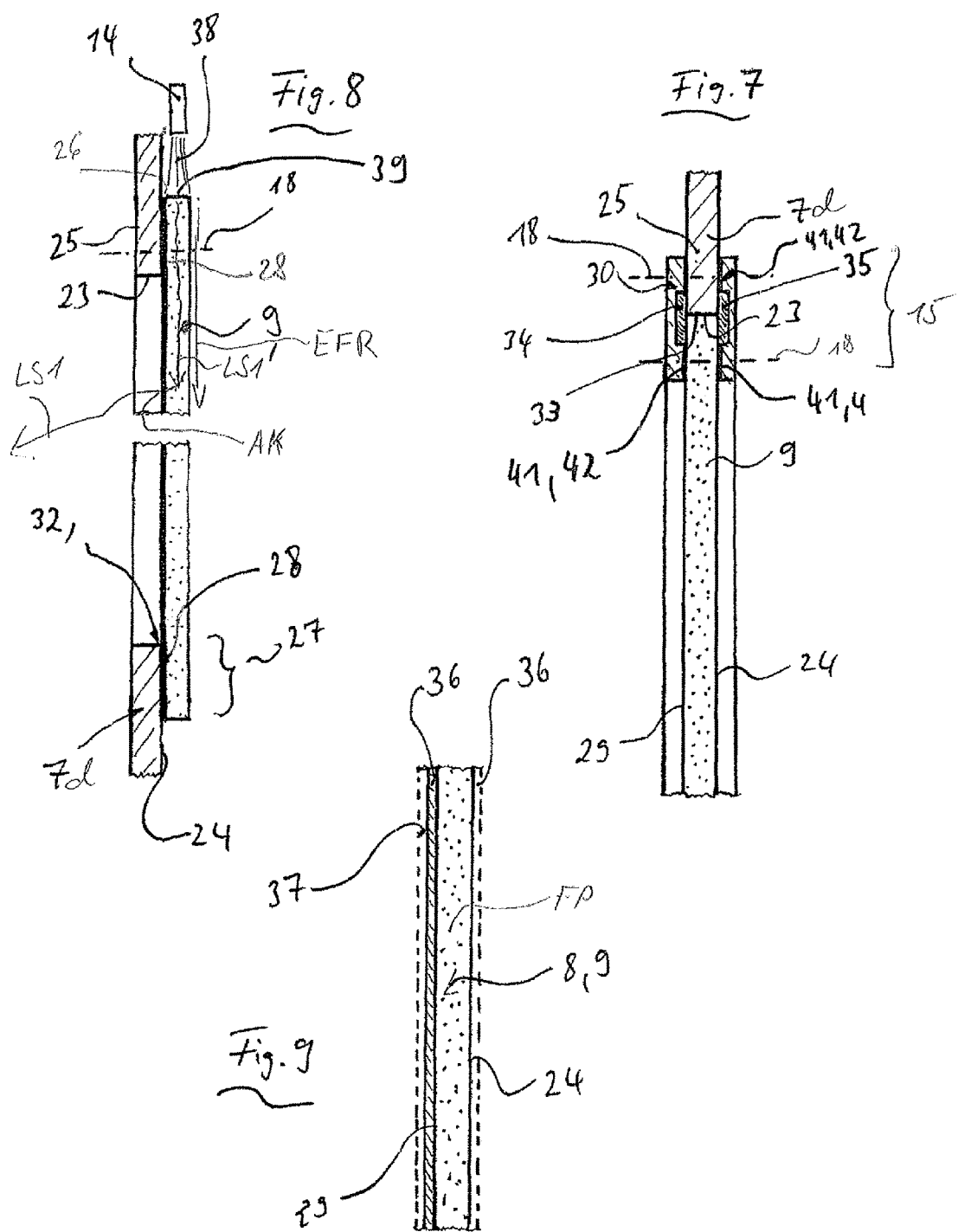

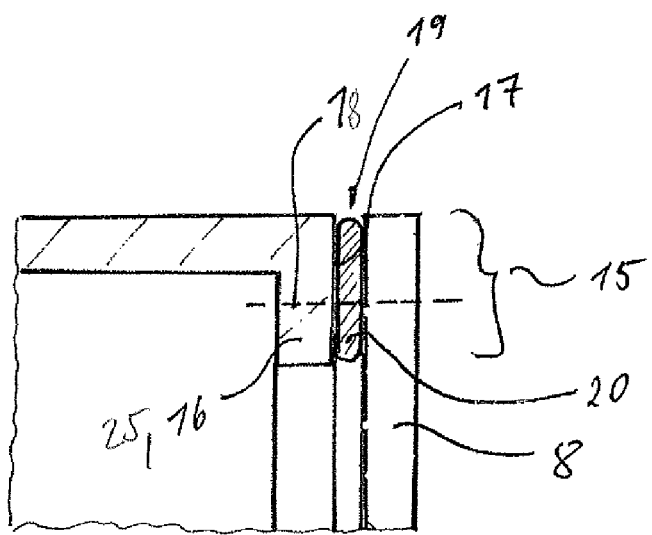

HOUSEHOLD APPLIANCE WITH AT LEAST ONE LUMINOUS SURFACE IN THE TREATMENT AREA

BACKGROUND OF THE INVENTION

The invention relates to a household appliance with a treatment compartment, in particular here a dishwasher, in which the treatment compartment is a dishwashing compartment enclosed by a dishwashing container, in which items to be washed are cleaned at a high temperature using chemicals. Generally conditions prevail in treatment compartments, for example in the cavities of ovens holding food to be cooked or the drying chambers of tumble dryers holding laundry, which are different, in some instances considerably different, from those of the normal environment in respect of temperature, moisture, etc. In order to improve lighting conditions, an electric lighting means is often provided in the treatment compartment but this requires shielding from conditions prevailing in the treatment compartment and also the passage of one or more electric power cables through a wall delimiting the treatment compartment. It is also disadvantageous that such lighting means are often problematic, as they reduce the useful space in the treatment compartment and can often only be positioned in such a manner that they dazzle the user when said user loads or unloads the treatment compartment.

BRIEF SUMMARY OF THE INVENTION

The object of the invention is therefore to provide a household appliance, in particular a dishwasher, with improved lighting or illumination of its treatment compartment.

This object is achieved by the features of the independent claim. By replacing at least one of the walls, in particular the rear wall of the treatment compartment, of a household appliance with a treatment compartment delimited by a number of walls, predominantly or entirely with a luminous surface element, the lighting situation in the treatment compartment is improved in a structurally simple manner as, because at least one wall of the treatment compartment is formed entirely or at least largely by a luminous surface element, an illumination region with a large surface, in other words an extended illumination region, is provided, which enables better lighting of the treatment compartment than a former spot-type light source, which is also positioned on a side wall of the treatment compartment projecting into said treatment compartment, as well as in addition or independently thereof allowing a plurality of illumination effects, light designs or light configurations. It also means that the defined spatial volume of the treatment compartment is no longer adversely affected, in particular reduced, as before by the housing, which projects into the treatment compartment, of a spot-type light source positioned on a side wall of the treatment compartment.

In the context of the invention the internal wall of the door, which faces the treatment compartment in its closed end position, in particular also counts as one of the walls of the treatment compartment. This internal wall of the door can also be configured in its entirety or partially as a luminous surface element according to the inventive construction principle.

In particular when the rear wall is replaced largely or entirely by a luminous surface element, in other words is largely formed by just this, it is possible to ensure the illumination of the treatment compartment in a structurally simple manner without restricting the available space therein. A correspondingly large, window-type opening can optionally be provided in the rear wall, which is covered by the luminous surface element or into which the luminous surface element is inserted. If the household appliance has a door positioned in a movable manner at the front for opening and closing the treatment compartment, the luminous surface element now allows in particular the rear region of the treatment compartment facing away from the door at the front and until now generally in darkness to be lit sufficiently. This improves user-friendliness and convenience for a user of the household appliance.

The luminous surface element expediently replaces or substitutes for at least 50%, in particular at least 75%, preferably between 80% and 100%, of the total surface of at least one wall delimiting the treatment compartment. This allows this predominantly or entirely replaced delimiting wall to form an extended light object with a large surface per se, which provides light. It is lighter than the other delimiting walls of the treatment compartment, which are not replaced by a luminous surface element. This allows in particular a plurality of interesting light configuration options. In addition or independently hereof larger volume regions in the treatment compartment than before can be lit properly, in particular more homogeneously, compared with just a spot-type light source.

The luminous surface element is expediently formed by a plate-shaped or panel-type element. This allows it to be produced as a structurally simple component, which is advantageous for the mass production of household appliances. It also allows it to be joined to other wall parts in a simple manner to form a vessel, which surrounds or encloses a desired treatment compartment. Thus for example a dishwashing container for a dishwasher having a roughly rectangular loading opening at the front can be put together in a simple manner in respect of assembly from two side wall parts, a top wall part, a base wall part and a rear wall part in the form of the luminous surface element. The plate-shaped or panel-type geometric shape of the luminous surface element also allows it to be produced in a simple manner in respect of manufacture from a glass material and/or plastic material.

In particular it can be expedient if the luminous surface element is configured with a largely flat surface, in particular with a smooth surface, at least on its internal wall surface facing the treatment compartment. This reduces or largely prevents the adherence of dirt particles to the luminous surface element compared with a luminous surface element without a flat surface, in particular without a smooth surface; in other words it remains largely clean. The luminous surface element can also be cleaned easily if it does become dirty. This configuration of the luminous surface element with a flat surface, in particular with a smooth surface, is particularly favorable in the case of a dishwasher, when at least one wall, e.g. the rear wall of its dishwashing container, is replaced with an inventive luminous surface element. Dirt particles, for example food residues, which are to be detached from the items to be cleaned, such as for example dishes and/or flatware, in the dishwashing container by being sprayed with wash fluid by one or more spray facilities, therefore remain on the luminous surface element to a much lesser degree or scarcely at all.

According to one advantageous development of the invention the luminous surface element fills an opening in a wall or between adjacent walls of the treatment compartment in particular in a flush manner, in other words it is inserted in a flush manner as part of the wall in the opening in a wall or as an entire wall replacement in a gap between adjacent walls. This ensures a constant, preferably flat transition between the luminous surface element and wall edge zones, which enclose the opening in the wall, in particular on the internal face facing the treatment compartment. Correspondingly the flush fitting of the luminous surface element into a gap between adjacent walls ensures a largely step-free, continuous transition between the luminous surface element and said adjacent walls. This favors for example the production of a largely fluid-tight and/or mechanically resistant, in particular stable, connection between the luminous surface element and the wall edge zones around the respective opening or between the luminous surface element and the adjacent walls. Also the continuous transition allows a largely soil-resistant container construction, which encloses the treatment compartment with its walls, in particular a dishwashing container construction for a dishwasher, to be achieved.

Alternatively it can in some instances be expedient if the luminous surface element covers the wall edge zones around the opening in the respective wall or the adjacent walls around a wall gap to be replaced in such a manner that edges overlap from its external wall surfaces facing away from the treatment compartment. Such overlaps allow a mechanically perfect and/or fluid-tight connection to be produced in a simple manner between the luminous surface element in the opening in the respective wall or in the gap between adjacent walls. As the mounting of the luminous surface element therefore takes place from the outside of the walls of the treatment compartment, fastening and/or sealing means remain invisible on the inside of the treatment compartment and pose no problems there. In particular it means largely that they are not exposed directly to a treatment medium in the interior of the treatment compartment, for example a cleaning liquor in the dishwashing container of a dishwasher, which could otherwise result in damage to the fastening and/or sealing means. This ensures the durability of the structure.

It can also be advantageous for at least one sealing means to be provided in a join between the luminous surface element and an edge of the opening. This ensures that the treatment compartment is sealed adequately.

According to one advantageous development of the invention the luminous surface element is configured as light-conducting and/or light-emitting in such a manner that an, in particular largely homogenous, backlight is provided. This allows in particular largely dazzle-free illumination of the treatment compartment and/or a pleasing light configuration in the treatment compartment in a wide range of conditions. For example the rear wall of a dishwashing container of a dishwasher can be formed by a luminous surface element configured as a backlight. This allows cleaned items to be lit from the rear, i.e. from the face of the interior of the dishwashing container facing away from the loading opening, and the degree of cleanness to be more visible to a user when said user opens the front door of the dishwasher after the end of a dishwasher program and looks into the interior of the dishwashing container.

According to a further advantageous development of the invention the luminous surface element is configured as light-conducting and/or light-emitting in such a manner that one or more light beams from at least one light source disposed outside the treatment compartment can be coupled into the luminous surface element at one coupling in point at least, one or more coupled in light beams are able to be propagated in the luminous surface element from their respective coupling in point in a propagation direction running parallel to the internal wall surface of the luminous surface element facing the treatment compartment and of the one or more light beams propagated in this manner, in particular perpendicular to their direction of propagation, from the internal wall surface of the luminous surface element facing the treatment compartment, one or more light beams can be coupled out at one or more coupling out points, which are different from the respective coupling in point, into the treatment compartment, although the luminous surface element is configured as largely non-transparent when viewed from the treatment compartment. This allows the light to be emitted into the treatment compartment in a largely diffuse manner, so that dazzling of the user of the household appliance is largely prevented when said user looks into the treatment compartment. As the outside of the luminous surface element does not show through in an inward direction when viewed from the treatment compartment, parts and components of the household appliance, e.g. a light source, can be disposed there without posing any problems.

In order to allow the luminous surface element to shine inward into the treatment compartment, the light source is expediently configured and disposed in such a manner that light beams emitted by it strike the external wall surface of the luminous surface element facing away from the treatment compartment at one or more points and/or at least one end face of the luminous surface element. It can be favorable here if at least one optical transmission element, in particular at least one optical waveguide, is coupled optically at one end to the light source and at the other end to the luminous surface element. This allows the light source to be accommodated spatially at a different point from the respective actual coupling in point in the household appliance. Thus in a dishwasher the light source can be accommodated for example in a base module below the dishwashing container and light beams emitted by it can be transported by way of at least one optical waveguide to one or more coupling in points on the external wall or end face of the luminous surface element.

It is particularly favorable if the luminous surface element is configured as a light guide with a large, i.e. flat extended, surface. This more readily allows regular lighting of the luminous surface element, as light can be coupled out at a plurality of coupling out points, which are distributed in a regular manner over the internal wall surface of the luminous surface element.

Generally speaking the luminous surface element is preferably configured in such a manner that it can emit light beams in a diffuse manner into the treatment compartment. The luminous surface element expediently has extractors for this purpose. The material layer of the luminous surface element for example can thus contain scattering and/or reflecting particles, in particular colored particles. In this way at least the internal wall surface of the luminous surface element facing the treatment compartment can be configured as largely non-transparent, in particular as having an opaque effect, when viewed from the outside, in particular from the treatment compartment.

It can in some instances be advantageous that at least the internal wall surface of the luminous surface element facing the treatment compartment is provided with at least one structured or particle layer, in particular colored layer, which allows the passage of light from the interior of the layer of the luminous surface element to the outside and which is largely non-transparent, in particular has an opaque effect, when viewed from the outside, in particular from the treatment compartment. This allows the luminous surface element to be produced in a favorable manner. It can take on a light function and also the function of a conventional wall of the treatment compartment, which is non-transparent. Thus a plastic plate or a glass plate or a composite plate of said materials can be sufficient if it is coated with at least one colored layer or other structured or particle layer on its internal wall surface facing the treatment compartment.

It can also be favorable if the luminous surface element is provided with at least one light-permeable protective layer at the top on the outside of at least its internal wall surface. This makes it largely resistant to treatment media, e.g. wash liquor in the dishwashing container of a dishwasher.

It can also be advantageous in some instances if the luminous surface element is configured as electroluminescent or photoluminescent. In order to stimulate an electroluminescent luminous surface element to light up, it is preferably connected to a voltage source, which is disposed in particular outside the treatment compartment, for example in a base module below the treatment compartment. An electroluminescent luminous surface element can also be provided in the form of a field of organic light-emitting diodes, e.g. OLEDs, or inorganic light-emitting diodes, e.g. LEDs, which are arranged respectively in the manner of floodlights. When a photoluminescent luminous surface element is used, it can be sufficient for adequate lighting of the luminous surface element, if light strikes the luminous surface element for example from a light source disposed at the front in the region of the loading opening of the treatment compartment, for example LEDs. In some instances light from an external light source or ambient light can be sufficient, entering the treatment compartment when the front door of the household appliance is opened and striking the photoluminescing surface of the luminous surface element.

The inventive household appliance is formed in particular by a dishwasher with a treatment compartment in the form of a dishwashing compartment. A luminous surface element that predominantly or entirely replaces a wall of the dishwashing container is particularly expedient there, as the inventive luminous surface element allows the interior of the dishwashing container to be configured as brighter over a large surface than with just spot-type illumination. This is particularly favorable when the dishwashing container is loaded with items to be washed, e.g. dishes and/or flatware, in one or more loading units, e.g. racks and/or flatware drawers, and its interior is therefore significantly shaded from external ambient light, for example kitchen light, by the items being washed and the racks when the front door is opened.

To summarize the treatment compartment of the household appliance has a treatment compartment with a light-conducting and/or light-emitting luminous surface element, which replaces a wall of the treatment compartment either entirely or predominantly. In the latter instance a wall of the treatment compartment has a window-type sub-region, which is occupied by the luminous surface element. The household appliance here can be provided with at least one light source disposed outside the treatment compartment for coupling light into the luminous surface element. In this respect the luminous surface element has a dual function as it is both a structural element, specifically forming a wall or a sub-region thereof delimiting a treatment compartment, and it also emits light coupled into it into the treatment compartment. The internal geometry of the treatment compartment and its useful volume thereby remain essentially the same, major structural adaptations of the treatment compartment due to a light source of the conventional type present therein, for example cables passing through a wall or the modification of components present in the treatment compartment, for example racks for items to be washed guided in a movable manner in the dishwashing container of a dishwasher, not being necessary. The light source is instead outside the treatment compartment, for example on the outside of the corresponding wall, which is replaced at least in a sub-region by the luminous surface element. A mechanical connection between light source and the luminous surface element functioning as a wall or sub-region of a wall is not necessary here, so light can even be coupled into moving walls or sub-regions, for example into a wall of a rotating drum, for example in a washing machine. In all the cited instances and embodiments the luminous surface element replacing the wall or a sub-region of the wall emits at least some of the coupled in light into the treatment compartment to light or illuminate it. The light source here can be disposed in such a manner that light emitted by it strikes the outer face facing away from the treatment compartment and/or at least one end face or side edge of the light-permeable wall or light-permeable sub-region.

The space conditions around the treatment compartment are often restricted in household appliances so space problems arise when it comes to positioning one or more light sources in said region. In one expedient variant such problems are eliminated by an optical transmission element, which preferably comprises at least one light guide, for example a glass fiber, which is coupled optically to both the light source and the luminous surface element. The light source can then be disposed in a region of the household appliance offering sufficient space, in the case of a dishwasher for example in a region below the dishwashing container. Because they take up little space, one or even more transmission elements can also be disposed in small gaps, for example between a wall delimiting the treatment compartment and an outer wall of the household appliance.

The visual appearance of the treatment compartment in its illuminated state can be changed easily or adapted to the respective design requirements by coloring the luminous surface element. Such coloring can be achieved by using colored material, for example colored glass or plastic. Another option is to provide the outer and/or inner face of the luminous surface element with a light-permeable colored layer, in particular a plastic film. A further variant of a colored configuration is to use a luminescing, in particular fluorescing, material for the luminous surface element. The material then contains luminescing substances which are preferably embedded in the material of the luminous surface element or finely distributed or dissolved therein. The light coupled into the luminous surface element by a light source disposed outside the treatment compartment is then converted at least to some degree to luminescent light, which is colored according to the type of luminescent colorant or colorant mixture used.

In a further preferred embodiment the luminous surface element is configured as a light guide. A light coupled in at one point is conducted further within the luminous surface element and distributed over its entire volume or at least a part thereof. Such an embodiment is particularly advantageous in combination with a luminescing material. Such materials, which are configured as luminescing and also as light guides, are known as light-collecting plastics and generally contain fluorescent colorants.

Not every light-guiding and/or light-emitting material that can be used for a luminous surface element can also withstand the conditions in a treatment compartment. This can be remedied by providing an internal protective layer that allows the passage of light from the interior of the luminous surface element in the direction of the treatment compartment, for example in the form of a lacquer or film, which protects the luminous surface element in particular from moisture, aggressive chemical influences and also from too great a thermal load.

The material used for the wall or sub-region is primarily glass or plastic or a combination of said materials.

Other advantageous developments of the invention are set out in the subclaims.

The advantageous configurations and developments of the invention described above and/or set out in the subclaims can be applied individually or in any combination, except for example in cases of obvious dependencies or incompatible alternatives.

BRIEF DESCRIPTION OF THE DRAWINGS

The invention and its advantageous configurations and developments and their advantages are described in more detail below with reference to drawings showing schematic basic outlines, in which:

FIG. 3 shows a partial section of the dishwashing container from FIG. 2 along line III-III, with a wall, in particular the rear wall of the dishwashing container, being replaced entirely by a luminous surface element, FIG. 4 shows a view of a dishwashing container corresponding to FIG. 3, in which however only one sub-region of a wall of the dishwashing container is replaced with a luminous surface element, FIG. 5 shows a corner region of the dishwashing container corresponding to the section V in FIG. 3, in which light is coupled into the luminous surface element at an end face by means of an optical waveguide, FIG. 6 shows a view corresponding to FIG. 5 with modified light coupling in, FIG. 7 shows the section VII in FIG. 4, which clarifies the fixing of a luminous surface element in the window-type opening in a wall of a receiving compartment, FIG. 8 shows the section VIII from FIG. 4, showing a different type of fixing of a sub-region, FIG. 9 shows a sectional view of a luminous surface element, and FIG. 10 shows a view corresponding to FIG. 5, showing a further option for fastening a luminous surface element as a wall replacement between adjacent walls of a treatment compartment.

DETAILED DESCRIPTION OF EXEMPLARY EMBODIMENTS OF THE PRESENT INVENTION

Figure 1:
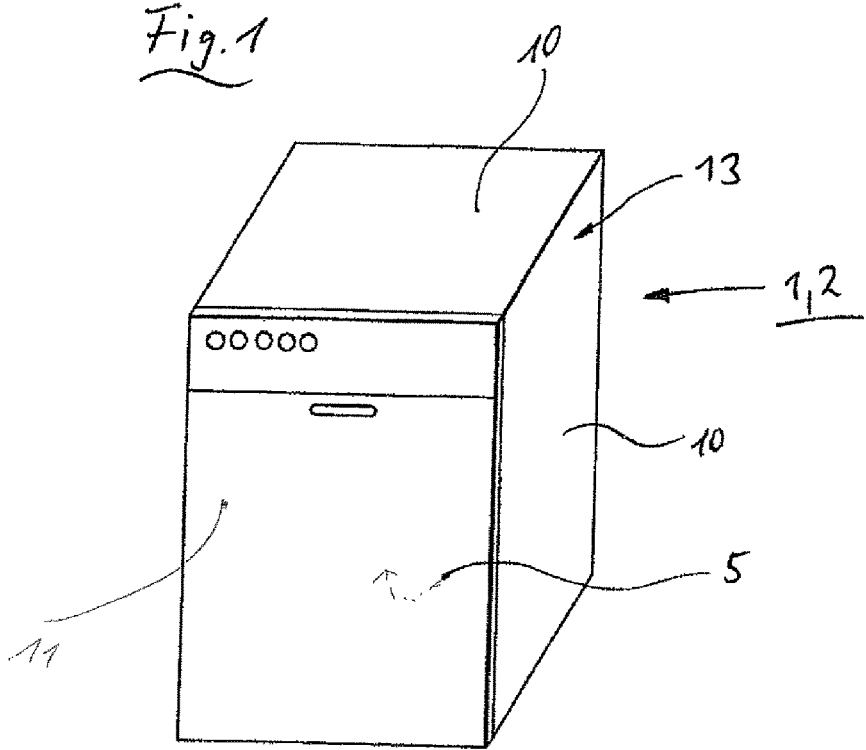
FIG. 1 shows a perspective view of a dishwasher as an example of an inventively configured household appliance.

In FIGS. 1 to 10 corresponding parts are shown with the same reference characters. Only those components of a household appliance, in particular a dishwasher, that are necessary for an understanding of the invention are provided with reference characters and described. It goes without saying that the inventive household appliance can comprise further parts and modules.

Figure 2:
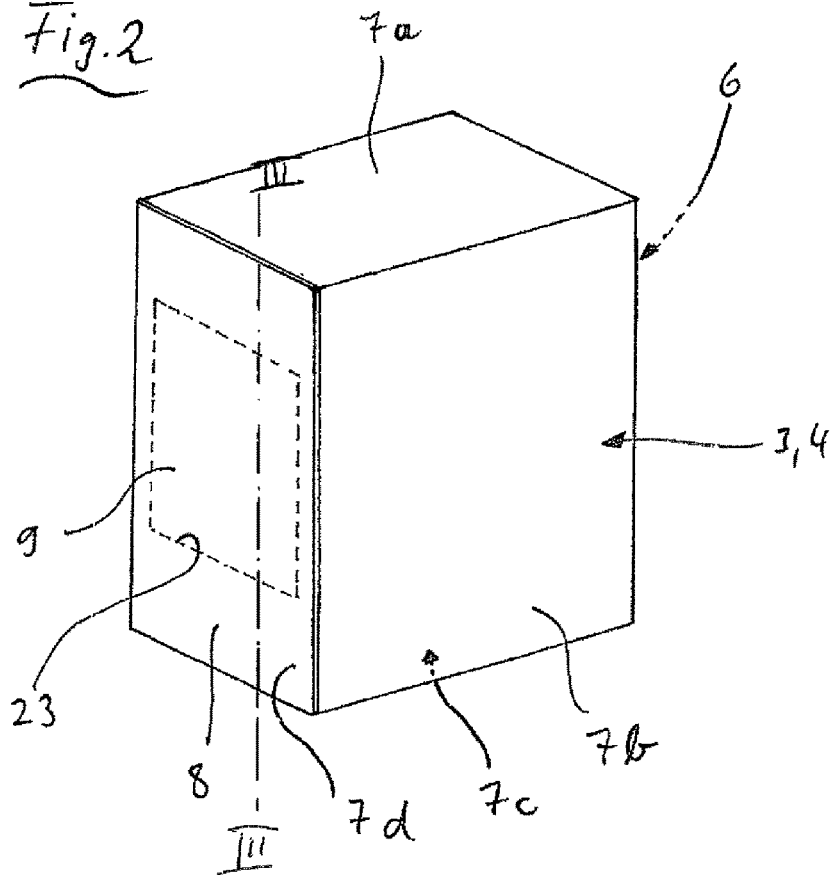
FIG. 2 shows a perspective view of a dishwashing container of the dishwasher shown in FIG. 1 from the rear.

FIG. 1 shows a schematic, slightly perspective front view of an example of a household appliance 1 in the form of a dishwasher 2 with a dishwashing container 3, its interior forming a treatment compartment 4, specifically a dishwashing compartment 5. FIG. 2 shows a slightly perspective view of the dishwasher 2 from the rear. A household appliance is frequently embodied as a built-in appliance and is enclosed on the outside by furniture walls when built in, it being possible then to dispense partially or entirely with an external housing. Otherwise it can expediently have a housing 13 formed by external walls 10, enclosing the side walls 7b, rear wall 7d and top wall 7a of the dishwashing container 3, as here in the present exemplary embodiment of a dishwasher 2. The dishwashing container 3 has a front loading opening 6 that can be closed by a front door 11. The dishwashing compartment 5 is delimited by a total of five walls 7, specifically a top wall 7a, two side walls 7b, a base wall 7c and a rear wall 7d, with at least one of these walls, in particular the rear wall 7d, being replaced with a luminous surface element 8. Alternatively at least one wall 7, in particular the rear wall 7d, can have a window-type opening 23, into which a luminous surface element 9 is inserted. This opening 23 in the rear wall 7d, with the luminous surface element 9 inserted therein, is shown with a broken line in FIG. 2. The respective luminous surface element 8, 9 replaces at least 50%, in particular at least 75%, preferably between 80% and 100%, of the surface of at least one wall, in particular the rear wall 7d. The luminous surface element 8, 9 therefore forms an illumination unit or light design unit with a large surface, allowing the respectively replaced wall surface to shine brightly compared to the other walls, such as 7a, 7b, 7c. To this end it can be configured in particular as a, preferably regularly emitting, backlight or as a diffuse light emitter. It is expediently configured as a plate or panel with a flat surface so that it is suitable for replacing a wall or wall part. It preferably has a rectangular shape (when viewed from above). For the lighting or emitting of light from the luminous surface element, it is expediently configured as a light-conducting or light-guiding light guide. Light beams, which are coupled into the luminous surface element, for example from a light source such as for example 14 (see FIG. 3) disposed outside the dishwashing container, or are generated by the stimulation of energy in the material of the luminous surface element, are propagated therein and are coupled out of the internal wall of the luminous surface element facing the interior of the dishwashing container into the interior of the dishwashing container at a plurality of coupling out points, in particular perpendicular to the propagation direction. To conduct or guide light the luminous surface element 8, 9 has a flat support plate made of a light-conducting or light-guiding material, for example glass, transparent or translucent plastic, e.g. acrylic glass, or a composite of the two materials. It comprises extractors for coupling light out of the light-guiding or light-conducting support plate. The coupling out of the light can be brought about by reflecting and/or scattering structures, such as FP (see for example FIG. 9), distributed in the light guide material of the flat support plate, by specific fine surface structures on the internal wall surface of the light-guiding or light-conducting support plate facing the treatment compartment and/or by fine patterns, of colored particles for example, applied to, in particular printed on, the internal wall surface of the light-conducting or light-guiding support plate facing the treatment compartment. The non-homogenous or heterogeneous distribution of the coupling out structures causes a largely regular lighting up of the surface of the luminous surface element to be achieved, as light beams from the light-conducting or light-guiding support plate are emitted into the interior of the treatment compartment scattered in all directions.

To summarize, the luminous surface element is configured as a light guide in such a manner that light, which is emitted for example from one or more spot-type or bar-type light sources, which is/are preferably disposed outside the treatment compartment, is distributed as regularly as possible over the surface of the luminous surface element in order to be able to provide a backlight. This is referred to in particular as light guiding or light conducting. Light, for example 38, can be fed in here for example at an end face, for example 39, of the luminous surface element, for example 8 (see FIG. 3). Alternatively or additionally light can be coupled into the light-guiding material of the luminous surface element, for example 8, by way of the rear external wall surface, for example 24, of the flat plate-shaped luminous surface element facing away from the treatment compartment (see FIG. 5). The flat light guide plate, for example 8, 9, is preferably made of glass or a transparent or translucent plastic, for example acrylic glass. It contains extractors, which couple the light out of the light guide into the treatment compartment. Coupling out can be brought about by scattering and/or reflecting structures distributed in the light guide material, by specific fine surface structures and/or by fine, in particular printed, patterns, for example in the form of a colored layer or another scattering and/or reflecting layer. To increase the light density of the luminous surface element light from one or more light sources can advantageously be coupled in at a number of points on the luminous surface element, for example at a number of points on an end face, in particular on two, three or all four end faces of the roughly rectangular plate of the luminous surface element. In addition or independently thereof light can also be fed into the light-guiding or light-conducting material of the luminous surface element at the rear external wall surface of the luminous surface element at a number of points distributed over the external wall surface.

The luminous surface element 8, 9 is preferably configured as light-conducting and/or light-emitting in such a manner that one or more light beams 38, 45 (see FIGS. 3, 8, 5) of at least one light source 14, 40 disposed outside the treatment compartment 4 can be coupled into the luminous surface element 8, 9 at one coupling in point 39, 24 at least, one or more coupled in light beams, for example LS1' (see FIG. 8) can be propagated from their respective coupling in point 39, 24 in a propagation direction EFR (see FIG. 8) running parallel to the internal wall surface 29 of the luminous surface element 8, 9 facing the treatment compartment 4 and of the one or more light beams, for example LS1', propagated in this manner, in particular perpendicular to their direction of propagation EFR, from the internal wall surface 29 of the luminous surface element 8, 9 facing the treatment compartment 4, one or more light beams LS1-LSn can be coupled out at one or more coupling out points AK, which are different from the respective coupling in point 39, 24, into the treatment compartment 4, although the luminous surface element 8, 9 is configured as largely non-transparent when viewed from the treatment compartment 4.

It can be advantageous in particular if the luminous surface element 8, 9 is configured as milky or as shining in some other diffuse manner when viewed from the treatment compartment side.

In the dishwasher 2 in contrast the other walls, for example 7a, 7b, 7c, of a dishwashing container are made in the conventional manner from a material that does not allow the passage of light, for example metal and/or opaque plastic.

Other structures can also be used to form a flat light emitter, for example those configured as light boxes. The light sources are then present in a flat well, which reflects the light in its interior in a diffuse manner and only allows it to exit in the direction of the open face, in this instance therefore in the direction of the treatment compartment 4. It can also be advantageous if specially shaped reflectors are used when the light source is fluorescent lamps and diffuser lenses are used for LEDs, so that the light exiting from the light well is approximately homogenous, despite the shallow mounting depth of the backlight.

If the light distributed from the flat, plate-shaped light guide or the light well has a different spatial structure, it may be advantageous if it is distributed in a regular manner by means of at least one diffuser, so that it approximates to a surface that shines in an absolutely regular, in particular white, manner. One simple solution is for example an opal scattering plate between light guide or light well and the internal wall surface 29 of the luminous surface element 8 facing the treatment compartment. Films in particular can also be used, which homogenize the light more efficiently than is possible with opal glass.

By coupling the light from at least one light source 14, for example an incandescent lamp or light-emitting diode, into the luminous surface element 8, 9 light is conducted further within said luminous surface element 8, 9 and finally emitted into the interior of the dishwashing container 3.

In the exemplary embodiment illustrated in FIG. 3 the rear wall 7d of the dishwashing container 3 is replaced entirely by the luminous surface element 8. It preferably has a rectangular plate shape. The outer edge region 15 of the luminous surface element 8 is fixed to the other adjacent walls 7a-7c, which are made of metal sheet for example, there being a number of different options for this. The walls 7a-7c can, as shown in FIG. 3, have a flange with an external mounting surface 17, to which the luminous surface element 8 is fixed as a wall replacement. The flange 16 here encloses a preferably rectangular gap or opening 23 on the rear face of the dishwashing container 3 in the manner of a rectangular frame. The clear width of the preferably rectangular gap 23 is only slightly smaller, when viewed in the height-wise direction, than the distance between base wall 7c and top wall 7a and, when viewed in the widthways direction, only slightly smaller than the distance between the two side walls 7b. The flange 16 can be formed by a 90° bead, in an inward direction toward the opening 23, of the rear end-face edge regions of the top wall 7a, the side walls 7b and the base wall 7c. The large luminous surface element 8 can be fixed to the flange 16 for example with the aid of an adhesive layer 21, which also ensures the sealing of a join 19 between the mounting surface 17 and the luminous surface element 8, so that no wash fluid can exit in an outward direction between the flange 16 and the luminous surface element 8.

FIG. 10 shows an additional or alternative fixing specifically by way of a screw connection between the outer edge region 15 of the plate-shaped, in particular rectangular, luminous surface element 8 and the flange 16. The screw connection is shown with a broken line in FIG. 10. A seal 20, made for example of an elastomer material, is disposed in the join 19 between the luminous element 8 and the mounting surface 17.

In some instances just a window-type, in particular rectangular, opening, for example 23, in a light-impermeable, opaque wall, in particular the rear wall 7d, of the dishwashing container 3 can be closed off in a sealing manner by a luminous surface element 9, there being different options for this. One option is for the luminous surface element 9 to be inserted with a perfect fit into the opening 23 (see FIG. 4). The external geometric shape or external contour of the luminous surface element 9 here corresponds generally speaking essentially to the internal geometric shape or internal contour of the opening 23. The dimensions of the luminous surface element are selected in particular so that the end-face outer edge of the luminous surface element 9 and the end faces of the remainder of the rear wall 7d facing the opening 23 are in contact with one another, so that the luminous surface element 9 is inserted into the opening 23 in a largely flush manner and there is a continuous transition between the luminous surface element and the edge region of the rear wall 7d enclosing the opening 23. The luminous surface element 9 can be fixed in the opening 23 for example with the aid of an adhesive layer 31, which also ensures a seal in the join 22, which is present between the end faces of the plate-shaped luminous surface element 9 in the opening 23 and the end faces of the remaining edge region of the rear wall 7d enclosing the opening 23, which face it. Such a fastening is recommended if the respective wall has a relatively large thickness. For flush insertion of the luminous surface element 9, it has roughly the same wall thickness as the wall 7, in particular the rear wall 7d. This produces an ongoing, continuous transition on the dishwashing compartment side between the remaining surface edge of the wall, for example 7d, and the inserted luminous surface element 9.

Alternatively the luminous surface element can be fixed to the inside or, as shown in FIG. 8, preferably to the outside of a wall, for example the rear wall 7d of the treatment compartment 4 or dishwashing compartment 5, the luminous surface element 9 being dimensioned such that it overlaps the edge 25 of the wall 7d framing the opening 23 on the outside, in other words on the face facing away from the dishwashing compartment 5. The luminous surface element 9 can be fixed to the edge 25 of the rear wall 7d in a different manner again, for example with the aid of an adhesive layer 28, which also provides a seal for the join 26 in the overlap region 27 between the edge 25 and the luminous surface element 9. Fixing can also take place additionally or alternatively by means of a screw connection, indicated by the broken line 18. A peripheral seal, corresponding to the seal 20 in FIG. 10, can also be provided instead of the adhesive layer 28.

A further means of fastening the luminous surface element 9 is finally shown in FIG. 7. Here too a, preferably rectangular, opening 23 is present in a wall 7, in particular the rear wall 7d, made of metal or opaque plastic, into which opening 23 the luminous surface element 9 is inserted with a perfect fit and in particular in a largely flush manner. It is configured here as a flat light guide plate with a flat surface. Positioned on the outside 24 and inside 29 of the outer edge region of the luminous surface element 9 adjacent to the end face of the luminous surface element 9 is a holding or fixing element 30, for example a retaining ring, which also overlaps and therefore holds the outside and inside of an edge zone 25 of the wall 7, in particular the rear wall 7d, delimiting the opening 23. The luminous surface element 9 and the edge 25 preferably have the same thickness, so their surfaces are largely flush with one another. A join 33 between the luminous surface element 9 and the edge 25 of the wall 7, in particular metal sheet wall, is closed with a seal 35, which is disposed in a recess 34 in the holding or fixing element 30, which opens in the direction of the luminous surface element 9. The fixing of the holding or fixing element 30 to the wall 7, in particular rear wall 7d, and the luminous surface element 9 can in turn be brought about by a screw fastening, indicated by the broken line 18, and/or with the aid of an adhesive layer 41 in the join 42 between the holding or fixing element 30 and the wall 7 and/or the luminous surface element 9.

The respective luminous surface element 8 or 9 can in particular be embodied in such a manner that the light emitted by it into the treatment compartment has a different color from the coupled in light from the light source 14. This can be brought about for example if the material of the luminous surface element 8, 9 contains colorants FP or other scattering and/or reflecting particles. It is however also possible in addition or alternatively thereto for a colored layer 36 or other particle layer to be applied, for example adhered (FIG. 9) to the inside or internal wall surface 29 and/or outside or external wall surface 24 of the luminous surface element 8, 9, for example in the form of a colored plastic film or the like. The colorants used can also be luminescing colorants. In a further possible embodiment the wall-replacing luminous surface element 8 or 9 can also be configured as a light guide, with further optical configuration options resulting together with a luminescing colorant contained in a material of the luminous surface element 8, 9.

To protect against conditions prevailing in the treatment compartment 4, for example to protect against cleaning chemicals, moisture or high temperatures, the luminous surface element 8, 9 can be provided on the inside, in other words on the face facing the treatment compartment 4, in particular the dishwashing compartment 5, with a protective layer 37 made of a material that allows the passage of light from the interior of the layer of the luminous surface element 8, 9 outward in the direction of the treatment compartment 4, for example with a lacquer or plastic film, which has a largely non-transparent, in particular opaque, effect when viewed from the outside, in particular from the treatment compartment 4.

The protective layer 37 is applied either directly to the internal wall of the light-guiding support plate of the luminous surface element facing the treatment compartment. If a colored layer 36 is present on the internal wall surface 29 facing the treatment compartment, the protective layer is applied to this as a top finishing layer, as shown in FIG. 9. If light is coupled in by way of an end face of the luminous surface element 8, 9, the emission of light into the treatment compartment 4 can be amplified, in that the luminous surface element 8, 9 is provided with a layer that reflects light beams in the direction of the treatment compartment 4 on the outside, in other words on the external wall surface 24 facing away from the treatment compartment.

Light can in principle be coupled in in such a manner that the light source 14 is disposed at a distance, in other words leaving an air gap, from the luminous surface element 8, 9. The light source 14 can then be embodied in particular in such a manner that its light cone 38 strikes the external wall surface 24 of the luminous surface element 8, 9 entirely. In particular a number of light sources 14 can be provided with such a spatial offset from one another that their light cones cover different regions of the external wall surface 24 of the luminous surface element 8, 9 (FIG. 4). However it is also possible for a light source 14 to be disposed so that its light cone 38 strikes the end face 39 of the luminous surface element 8, 9 (FIG. 3). In some instances one or more light sources can also be provided on a number of end faces of the luminous surface element 8, 9 to couple in light at the end faces.

An optical transmission element 40 in particular can be provided to couple in light. It is formed for example from one or more optical waveguides, for example glass fibers, and is coupled on the one hand to the light source 14 and on the other hand to an external wall surface 24 or an end face 39 of the luminous surface element 8, 9. The optical coupling between the transmission element 40 and the luminous surface element 8, 9 can in some instances be contactless, in particular with an intermediate optical or mapping unit. A distance 44 or free air gap is then present between the light exit surface 43 of the transmission element 40 and the luminous surface element 8, 9. A light cone 45 forms at the light exit surface 43 (see FIG. 5). The optical coupling can however also be direct; in other words the light exit surface 43 of the transmission element 40 is connected mechanically to the luminous surface element 8, 9. With each type of optical coupling an optical deflection element 46 or an optical mapping system can be connected upstream of the light exit surface 43. In order to strike a larger surface region of the luminous surface element 8, 9 with light and/or to increase its light density, it may be expedient to provide a number of light sources 14 and/or a number of transmission elements 40. FIG. 3 shows an instance in which a number of transmission elements 40a, 40b are connected optically to a light source 14, their light exit surfaces 43 being disposed in different positions on the external wall surface 24 of the luminous surface element 8.

LIST OF REFERENCE CHARACTERS

| | |
|---|---|
| 1 | Household appliance |
| 2 | Dishwasher |
| 3 | Dishwashing container |
| 4 | Treatment compartment |
| 5 | Dishwashing compartment |
| 6 | Loading opening |
| 7, 7a, 7b, 7c, 7d | Walls |
| 8, 9 | Luminous surface element |
| 10 | External wall |
| 11 | Door |
| 13 | Housing |
| 14 | Light source |
| 15 | Edge region |
| 16 | Flange |
| 17 | Mounting surface |
| 18 | Line |
| 19 | Join |
| 20 | Seal |
| 21 | Adhesive layer |
| 22 | Join |
| 23 | Opening |
| 24 | Outside or external wall surface |
| 25 | Edge |
| 26 | Join |
| 27 | Overlap region |
| 28 | Adhesive layer |
| 29 | Inside or internal wall surface |
| 30 | Retaining ring |
| 31 | Adhesive layer |
| 32 | Adhesive layer |
| 33 | Join |
| 34 | Recess |
| 35 | Seal |
| 36 | Colored layer |
| 37 | Protective layer |
| 38 | Light cone |
| 39 | End face |
| 40 | Transmission element |
| 41 | Adhesive layer |
| 42 | Join |
| 43 | Light exit surface |
| 44 | Distance |
| 45 | Light cone |
| LS1-LSn | Coupled out light beams |
| LS1' | Light beam propagated in material of luminous surface element |
| AK | Coupling out points |
| FP | Colored particle |

The invention claimed is:

1. A household dishwasher comprising a plurality of walls delimiting a treatment compartment, the household dishwasher comprising a dishwasher housing having a dishwashing compartment formed by the treatment compartment, at least one of the walls being configured predominantly or entirely with a luminous surface element which is operative to illuminate the treatment compartment, at least artificial light source which produces artificial light;
wherein the at least one of the walls is a rear wall of the treatment compartment,
wherein the luminous surface element comprises a plate-shaped luminous surface element which is configured to at least one of conduct or emit the artificial light,
wherein the plate-shaped luminous surface element has an internal wall surface which faces and is exposed to the treatment compartment,
wherein the plate-shaped luminous surface element is provided with at least one protective layer on the internal wall surface exposed to the treatment compartment and configured to protect against conditions prevailing in the treatment compartment including protecting against cleaning chemicals, the at least one protective layer being configured to allow the passage of the artificial light from the plate-shaped luminous surface element into the treatment compartment,
wherein the plate-shaped luminous surface element has an external wall surface which defines a rear external wall surface of the household dishwasher that is exposed to ambient surroundings,
wherein an outer edge region of the plate-shaped luminous surface element is fixed to the other of the plurality of walls, with each of the other plurality of walls having a flange with a mounting surface to which the plate-shaped luminous surface element is fixed, and
wherein each flange is directed inwardly so as to face an interior of the dishwashing compartment in the shape of a rectangular frame that defines a rectangular opening in a rear, vertical face of the dishwasher housing.

2. The household dishwasher of claim 1, wherein the luminous surface element is sized to occupy at least 50% of a surface of the at least one wall.

3. The household dishwasher of claim 1, wherein the luminous surface element is sized to occupy at least 75% of a surface of the at least one wall.

4. The household dishwasher of claim 1, wherein the luminous surface element is sized to occupy between 80% and 100% of a surface of the at least one wall.

5. The household dishwasher of claim 1, wherein the luminous surface element has a substantially flat internal wall surface facing the treatment compartment.

6. The household dishwasher of claim 5, wherein the internal wall surface is smooth.

7. The household dishwasher of claim 1, wherein the luminous surface element is configured in one of three ways, a first way in which the luminous surface element fills an opening in the rear wall, a second way in which the luminous surface element fills an opening between the rear wall and an adjacent one of the walls of the treatment compartment, a third way in which the luminous surface element covers an opening in such a manner that edges overlap from external wall surfaces which form the mounting surface facing away from the treatment compartment.

8. The household dishwasher of claim 7, further comprising at least one sealing member provided in a join between the luminous surface element and an edge of the opening.

9. The household dishwasher of claim 1, wherein the luminous surface element has a light-conducting or light-emitting characteristic sufficient to realize a substantially homogenous backlight.

10. A household dishwasher comprising a plurality of walls delimiting a treatment compartment, the household dishwasher comprising a dishwasher housing having a dishwashing compartment formed by the treatment compartment, at least one of the walls being configured predominantly or entirely with a luminous surface element which is operative to illuminate the treatment compartment,
   wherein the at least one of the walls is a rear wall of the treatment compartment, the rear wall defining an exposed exterior vertical rear wall surface of the household dishwasher, and the rear wall being configured predominantly or entirely with the luminous surface element,
   wherein an outer edge region of the rear wall is fixed to the other of the plurality of walls, with each of the other plurality of walls having a flange with a mounting surface to which the rear wall, which is configured predominantly or entirely with the luminous surface element, is fixed,
   wherein each flange is directed inwardly so as to face an interior of the dishwashing compartment in the shape of a rectangular frame that defines a rectangular opening in a rear, vertical face of the dishwasher housing, and
   wherein the luminous surface element has a light-conducting or light-emitting characteristic sufficient to enable at least one light beam from at least one light source disposed outside the treatment compartment to be coupled into the luminous surface element at at least one coupling-in point, to enable the coupled in light beam to be propagated in the luminous surface element from the coupling-in point in a propagation direction in parallel relationship to an internal wall surface of the luminous surface element in facing relationship to the treatment compartment, and to enable coupling out of a light beam from the propagated light beam from the internal wall surface of the luminous surface element at a coupling-out point, which is different from the coupling-in point, into the treatment compartment, with the luminous surface element being configured as largely non-transparent when viewed from the treatment compartment.

11. The household dishwasher of claim 10, wherein the light beam is coupled out perpendicular to the propagation direction.

12. The household dishwasher of claim 10, wherein the at least one light source is configured and disposed in such a manner that light beams emitted by the light source strike an external wall surface of the luminous surface element facing away from the treatment compartment at at least one point or at least one end face of the luminous surface element.

13. The household dishwasher of claim 10, further comprising at least one optical transmission element coupled optically at one end to the light source and at another end to the luminous surface element.

14. The household dishwasher of claim 13, wherein the at least one optical transmission element is an optical waveguide.

15. The household dishwasher of claim 1, wherein the luminous surface element is configured as a light guide with a large surface.

16. The household dishwasher of claim 1, wherein the luminous surface element is configured to emit light beams in a diffuse manner into the treatment compartment.

17. The household dishwasher of claim 1, wherein the luminous surface element has a material layer made of a member selected from the group consisting of glass, transparent plastic, translucent plastic, and a composite thereof.

18. The household dishwasher of claim 1, wherein the luminous surface element has extractors for coupling light out into the treatment compartment.

19. The household dishwasher of claim 17, wherein the material layer of the luminous surface element contains scattering or reflecting particles.

20. The household dishwasher of claim 19, wherein the scattering or reflecting particles are colored particles.

21. The household dishwasher of claim 1, wherein the internal wall surface is provided with at least one structured or particle layer which allows passage of light from a layer interior of the luminous surface element outward in a direction of the treatment compartment and which is largely non-transparent.

22. The household dishwasher of claim 21, wherein the structured or particle layer is a colored layer.

23. The household dishwasher of claim 21, wherein the structured or particle layer has an opaque effect, when viewed from the outside.

24. The household dishwasher of claim 21, wherein the structured or particle layer has an opaque effect, when viewed from the treatment compartment.

25. The household dishwasher of claim 1, wherein the luminous surface element is provided with at least one protective layer, which allows passage of light in an outward direction from a layer interior of the luminous surface element at a top on an outside of at least the internal wall surface of the luminous surface element.

26. The household dishwasher of claim 1, wherein the luminous surface element is configured as electroluminescent or photoluminescent.

27. The household dishwasher of claim 1, further comprising a sealing member disposed between the rear wall which is configured predominantly or entirely with the luminous surface element and an external portion of the mounting surface of the flange.

28. A household dishwasher with a dishwashing compartment, which is delimited by a number of walls including a rear wall, and at least one artificial light source which produces artificial light;
   wherein the rear wall of the dishwashing compartment is replaced predominantly or entirely with a luminous surface element which is operative to illuminate the dishwashing compartment,
   wherein the luminous surface element comprises a plate-shaped luminous surface element which is configured to at least one of conduct or emit the artificial light and that fills an opening in the rear wall of the dishwashing compartment or covers the rear wall in such a manner that edges of the plate-shaped luminous surface element overlap with an external wall surface of the rear wall, the external wall surface facing away from the dishwashing compartment,
   wherein at least one seal is provided in a join between the plate-shaped luminous surface element and an edge of the opening,
   wherein the plate-shaped luminous surface element has an internal wall surface which faces the dishwashing compartment, and the plate-shaped luminous surface element is provided with at least one protective layer on the internal wall surface facing and exposed to the dishwashing compartment, the at least one protective layer being configured to protect against conditions prevailing in the dishwashing compartment including protecting against cleaning chemicals, and the at least one protective layer being configured to allow the passage of the artificial light from the plate-shaped luminous surface element into the dishwashing compartment, and wherein the plate-shaped luminous surface element has an external wall surface which defines a rear external wall surface of the household dishwasher that is exposed to ambient surroundings.

29. A household dishwasher with a dishwashing compartment, which is delimited by a number of walls including a rear wall, and at least one artificial light source which produces artificial light;

wherein the rear wall of the dishwashing compartment is replaced predominantly with a luminous surface element which is operative to illuminate the dishwashing compartment, wherein the luminous surface element comprises a plate-shaped luminous surface element which is configured to at least one of conduct or emit the artificial light and that is fixed to an outside of the rear wall and covers an opening in the rear wall in such a manner that edges of the rear wall around the opening overlap an internal wall surface of the plate-shaped luminous surface element facing the dishwashing compartment, wherein at least one seal is provided in a join between the plate-shaped luminous surface element and the edges of the rear wall around the opening, wherein the plate-shaped luminous surface element is provided with at least one protective layer on the internal wall surface facing and exposed to the dishwashing compartment and configured to protect against conditions prevailing in the dishwashing compartment including protecting against cleaning chemicals, the at least one protective layer being configured to allow the passage of the artificial light from the plate-shaped luminous surface element into the dishwashing compartment, and wherein the plate-shaped luminous surface element has an external wall surface which defines a rear external wall surface of the household dishwasher that is exposed to ambient surroundings.

30. A household dishwasher with a dishwashing compartment, which is delimited by a number of walls including a rear wall, wherein the rear wall of the dishwashing compartment is replaced predominantly with a luminous surface element, wherein the luminous surface element is fixed to an outside of the rear wall and covers an opening in the rear wall in such a manner that edges of the rear wall around the opening overlap an internal wall surface of the luminous surface element facing the dishwashing compartment, wherein at least one sealing member is provided in a join between the luminous surface element and the edges of the rear wall around the opening, wherein the luminous surface element is provided with at least one protective layer on the internal wall surface facing the dishwashing compartment;

wherein the luminous surface element is configured as at least one of light-conducting or light-emitting in such a manner that one or more light beams from at least one light source disposed outside the dishwashing compartment is operative to be coupled into the luminous surface element at one coupling in point at least, one or more coupled-in light beams are able to be propagated in the luminous surface element from their respective coupling-in point in a propagation direction running parallel to the internal wall surface of the luminous surface element facing the dishwashing compartment and of the one or more light beams propagated in this manner, perpendicular to their direction of propagation, from the internal wall surface of the luminous surface element facing the dishwashing compartment, one or more light beams can be coupled out at one or more coupling-out points, which are different from the respective coupling-in point, into the dishwashing compartment, with the luminous surface element being configured as non-transparent when viewed from the dishwashing compartment.

\* \* \* \* \*